United States Patent [19]
Dickerson et al.

[11] Patent Number: 5,338,057
[45] Date of Patent: Aug. 16, 1994

[54] UPPER CONTROL ARM FOR VEHICLE SUSPENSION

[75] Inventors: D. C. Dickerson, Hamburg; Robert G. Delbeke, Livonia, both of Mich.

[73] Assignee: Mascotech, Inc., Taylor, Mich.

[21] Appl. No.: 975,312

[22] Filed: Nov. 12, 1992

[51] Int. Cl.$^5$ .................................................. B60G 3/00
[52] U.S. Cl. .................................... 280/675; 280/673; 280/674; 280/691
[58] Field of Search ............... 280/663, 673, 675, 688, 280/690, 691, 674

[56] References Cited

U.S. PATENT DOCUMENTS

| | | | |
|---|---|---|---|
| 2,202,665 | 5/1940 | Metz, Sr. | 280/688 X |
| 2,939,720 | 6/1960 | Wroby | 280/673 |
| 3,237,362 | 3/1966 | Fromson | 428/48 |
| 3,551,990 | 1/1971 | Wehner | 280/673 X |
| 4,016,950 | 4/1977 | Allison | 280/691 X |
| 4,798,396 | 1/1989 | Minakawa | 280/673 |
| 4,964,651 | 10/1990 | Kubo | 280/690 |
| 5,009,448 | 4/1991 | Kijima et al. | 280/691 X |
| 5,026,090 | 6/1991 | Sekino | 280/673 |
| 5,163,603 | 11/1992 | Richart | 280/673 X |
| 5,169,171 | 12/1992 | Ban et al. | 280/690 X |

FOREIGN PATENT DOCUMENTS

| | | | |
|---|---|---|---|
| 0219563 | 9/1957 | Australia | 280/663 |
| 1158894 | 9/1956 | France | 280/673 |
| 0178408 | 8/1987 | Japan | 280/688 |
| 63-265710 | 11/1988 | Japan | 280/673 |
| 0238117 | 2/1990 | Japan . | |
| 0262407 | 10/1990 | Japan | 280/688 |

*Primary Examiner*—Margaret A. Focarino
*Assistant Examiner*—Florian Zeender
*Attorney, Agent, or Firm*—Edgar A. Zarins; Malcolm L. Sutherland

[57] ABSTRACT

An upper control arm for a vehicle suspension system and a method of making the same to form a reinforced arm for receiving a ball joint assembly. The arm is constructed by inserting an aluminum rod into a straight piece of steel tube with aluminum insert positioned at the center point of the tube, the tube is bent into the general shape of the control arm. The apex of the arm containing the aluminum insert is flattened into a substantially oval cross-sectional configuration. A hole is tapered reamed at the apex through both the tube and the aluminum insert to receive the ball joint assembly. As a result, critical sections of the control arm are reinforced yet a lightweight construction is maintained.

8 Claims, 1 Drawing Sheet

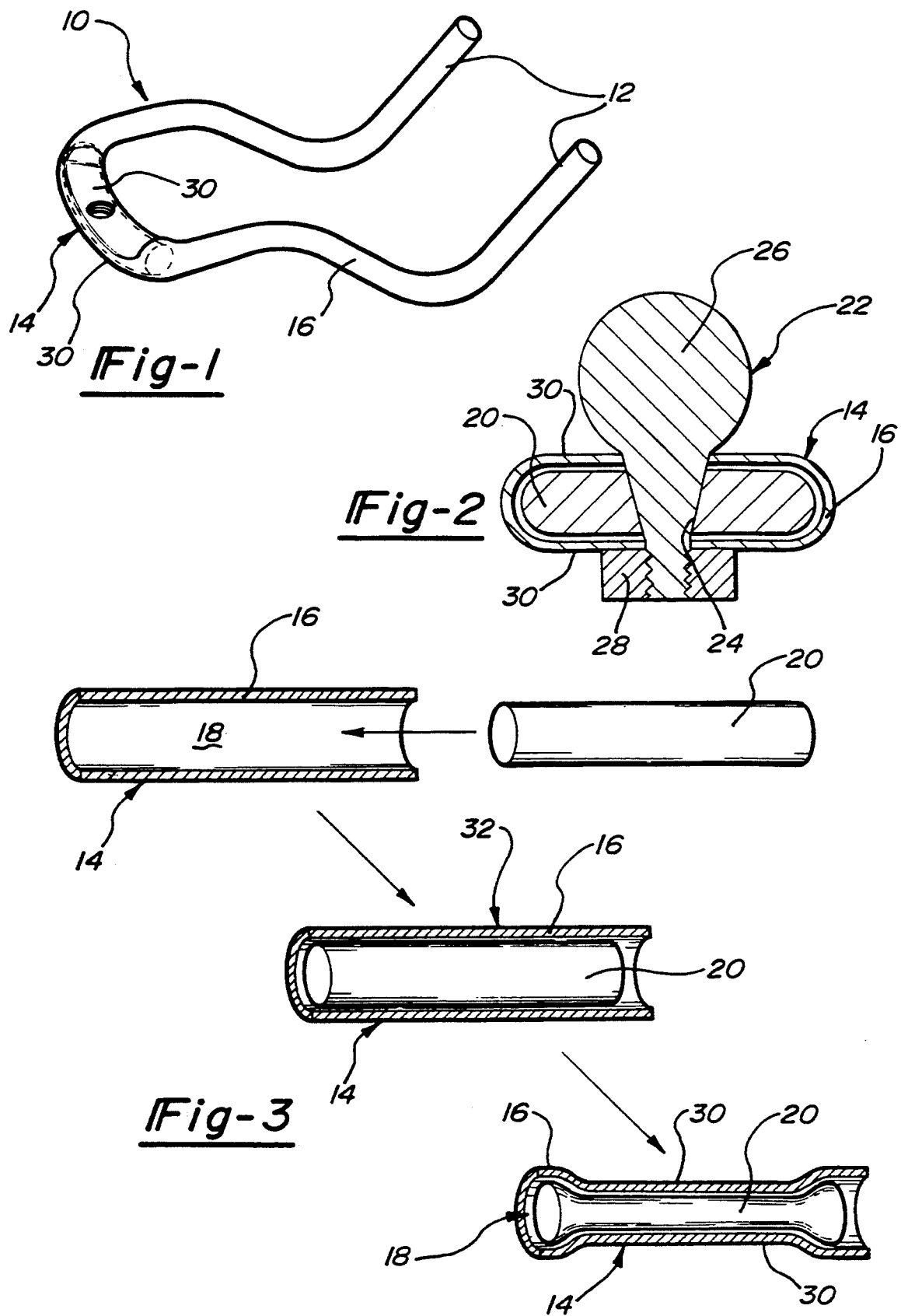

UPPER CONTROL ARM FOR VEHICLE SUSPENSION

BACKGROUND OF THE INVENTION

1. Field of the Invention

This invention relates to an upper control arm for a vehicle suspension system and, in particular, to a lightweight yet strong control arm and a method of making such control arms.

2. Description of the Prior Art

Upper control arms are routinely incorporated into the suspension systems of truck and passenger vehicles. The typical control arm is generally U-shaped with a ball joint assembly at the apex of the control arm and pivot bar bushings at the ends of the arm for mounting the control arm to a pivot bar assembly. In the past, the modulus sections between the bushings and the ball joint have been solid sections of cast iron or cast aluminum. It was believed that the traditional cast metal sections were necessary to maintain the integrity of the control arm under the stresses of the suspension system. More recently, the modulus section has been constructed of a steel forging of wire frame design. Although these control arm constructions were strong enough to withstand the stress loads they also were very heavy. In today's vehicle market every aspect of a vehicle is examined for weight reduction.

Recent proposals for reducing the weight of the suspension system include a hollow, two-piece control arm. The square hollow bar section comprises a pair of U-shaped components nested together and double seam welded. Thus, the control arm has double side walls with single upper and lower walls. Although strong and lightweight, the double side walls are not located at the compressive stress areas of the arm where additional strength is required. Moreover, the double seam construction requires precise welding over a curving contour which has not been easy to accommodate. Nevertheless, substantial weight reduction over the solid cross-section of the prior known control arms has been accomplished.

SUMMARY OF THE PRESENT INVENTION

The present invention overcomes the disadvantages of the prior known control arms by providing a lightweight arm which is economical to manufacture yet maintains sufficient structural strength for application in a vehicle suspension system.

The control arm of the present invention is manufactured by combining a steel tube with an aluminum insert. An aluminum rod is inserted into the steel tube and centered within the tube which will form the apex of the control arm. The tube is then bent into the general shape of the control arm with an apex for the ball joint assembly and a pair of arms which connect to a pivot bar of the suspension system. Thereafter, the apex of the control arm is flattened giving it a generally oval cross-sectional configuration and having the aluminum insert flattened therein. With the general configuration of the control arm formed the connection assemblies may be added. A hole is reamed or tapered through the tube and insert at the apex of the control arm. A ball stem for the ball joint assembly is inserted through the hole and secured within the hole by a nut on the underside of the arm.

The control arm of the present invention has a reduced weight because of the substantially hollow construction but maintains the necessary structural strength particularly at the apex of the arm which is connected to the ball joint assembly. The aluminum insert is positioned at the apex of the control arm within the steel tube. The arms of the control arm remain hollow as the insert does not extend much beyond the apex. The insert increases the strength of the arm apex but adds little excess weight to the arm. Flattening the apex also improves the structural strength of the control arm while providing flat surfaces for engagement of the ball joint assembly.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a control arm embodying the present invention;

FIG. 2 is a cross-sectional perspective of the apex of the control arm with a ball joint assembly mounted therein; and FIG. 3 is a partial cross sectional view of the control arm depicting formation of the apex of the arm.

DETAILED DESCRIPTION OF A PREFERRED EMBODIMENT OF THE PRESENT INVENTION

Referring first to FIG. 1, there is shown a control arm 10 for a vehicle suspension system embodying the present invention. The control arm 10 typically has a generally U-shaped configuration with a pair of arms 12 and an apex portion 14. The control arm 10 is also configured to strict standards in order to fit within the vehicle suspension system. In a preferred embodiment, the ends of the arms 12 are provided with means for attaching the control arm 10 to a pivot bar and the apex portion 14 includes a ball joint assembly such that the control arm 10 may be mounted within the suspension system.

Referring now to FIGS. 1 through 3, the control arm 10 at the present invention has a hollow or tubular construction formed by a pipe or tube 16 of predetermined length and having a passageway 18 therethrough. The tube 16 is bent into the desired configuration of the control arm 10 as will be subsequently described. Positioned within the apex portion 14 of the control arm 10 is an insert 20, preferably of aluminum, which reinforces the apex 14 of the control arm 10. The aluminum insert 20 improves the structural strength of the control arm 10 while minimizing the weight of the arm. Since the control arm 10 is substantially hollow except for the lightweight aluminum insert 20, the weight of the control arm 10 is minimized facilitating weight reduction for the overall vehicle.

In order to further improve the structural strength of the apex 14 of the control arm 10, the apex 14 has flattened or oval cross-sectional configuration as best shown in FIG. 2. The flattened configuration is less prone to bending thereby reinforcing a critical portion of the control arm 10. The flattened profile also facilitates fastening of the ball joint assembly 22. A tapered or reamed throughbore 24 in the apex 14 receives a ball member 26 which is secured therein by a nut 28 connected to a threaded end of the ball 26. Thus, the surfaces 30 of the control arm 10 provide a flat surface for the nut 28 and ball 26. Additional or substitute means of securing the ball joint assembly such as welding may be utilized.

The simple construction of the control arm 10 provides for an economical process of manufacturing as partially shown in FIG. 3. A straight tube is selected to the length of the control arm 10. The aluminum insert 20 is fed into the tube 16 and positioned at a center point 32 of the tube 16 which will represent the apex 14 of the control arm 10. The straight tube 16 with the insert 20 is then bent into the general configuration of the control arm 10 including a pair of arms 12, an apex 14 and any additional bends required to meet the specifications of the suspension system. In a preferred method, at the least the apex portion 14 of the control arm 10 is placed in a press to flatten the apex portion 10 and the insert 20 which provides it with the oval cross-sectional configuration. With the configuration of the control arm 10 formed, the tapered reamed 24 is formed at the center point 32 in the apex 14. The hole 24 is drilled through the tube 16 and insert 20 to form the throughbore 24. The ball 26 is inserted into the throughbore 24 with the threaded tip extending through the control arm 10. A nut 28 is attached to the threaded tip to secure the ball assembly on the control arm 10. As added measures, the ball assembly 22 may be welded onto the control arm 10 and pivot rings can be added to the ends of the arms 12.

The foregoing detailed description has been given for clearness of understanding only and no unnecessary limitations should be understood therefrom as some modifications will be obvious to these skilled in the art without departing from the scope and spirit of the appended claims.

What is claimed is:

1. A control arm for a vehicle suspension system adapted to be connected to a ball joint assembly and a pivot bar assembly, said control arm comprising:
   a tubular, substantially U-shaped body with a bight and a pair of remote arms extending from said bight, remote ends of said arms having means for connecting said control arm to the pivot bar assembly;
   a solid insert positioned within said tubular body at said bight to reinforce an intermediate section of said tubular body, said solid insert conforming to the cross-sectional configuration of said bight filling said tubular body at said bight; and
   means for connecting said control arm to a ball joint assembly of the vehicle suspension system, said connecting means mounted at said bight of said control arm extending through said tubular body and said solid insert such that the connection between said connecting means and said control arm is reinforced by said solid insert.

2. The control arm as defined in claim 1 wherein said tubular body and insert have a flattened, substantially oval cross-sectional configuration at said bight for improved structural strength.

3. The control arm as defined in claim 2 wherein said bight includes a throughbore formed in said tubular body and insert.

4. The control arm as defined in claim 3 wherein said connecting means comprises a ball joint extending through said bore of said bight and secured to said control arm.

5. The control arm as defined in claim 1 wherein said tubular body is made of steel and said insert is made of aluminum.

6. A control arm for a vehicle suspension system adapted to be connected to a ball joint assembly and a pivot bar assembly, said control arm comprising:
   a tubular body having a U-shaped configuration with a bight and a pair of remote arms having means for receiving the pivot bar assembly at ends of said arms;
   a solid insert positioned within said tubular body at said bight such that said insert substantially fills said tubular body at said bight, said bight portion of said control arm proximate said solid insert having a flattened substantially oval cross-sectional configuration for improved structural strength, said solid insert conforming to the cross-sectional and longitudinal configuration of said bight filling said tubular body at said bight; and
   a ball assembly for connecting said control arm to a ball joint housing of the vehicle suspension system, said ball assembly extending through said tubular body and solid insert at said bight of said control arm.

7. The control arm as defined in claim 6 wherein said bight includes a throughbore formed in said tubular body and solid insert, said ball assembly seated within said throughbore and secured to said control arm.

8. The control arm as defined in claim 6 wherein said insert is made of aluminum.

* * * * *